United States Patent [19]
Bender

[11] 3,818,914
[45] June 25, 1974

[54] APPARATUS AND METHOD FOR TREATMENT OF SKIN DISORDERS

[75] Inventor: Charles E. Bender, New Paltz, N.Y.

[73] Assignee: Spectroderm Inc., New Paltz, N.Y.

[22] Filed: Apr. 3, 1973

[21] Appl. No.: 347,499

Related U.S. Application Data

[63] Continuation-in-part of Ser. No. 244,645, April 17, 1972.

[52] U.S. Cl. .............................................. 128/396
[51] Int. Cl. .............................................. A61n 5/06
[58] Field of Search ............ 128/395, 396, 362, 371

[56] References Cited
UNITED STATES PATENTS

| | | | |
|---|---|---|---|
| 791,233 | 5/1905 | Wolpers | 128/395 X |
| 838,950 | 12/1906 | Coger et al. | 128/396 |
| 1,430,354 | 9/1922 | Burdick | 128/395 |

*Primary Examiner*—Lawrence W. Trapp

[57] ABSTRACT

Skin disorders are controlled by irradiation with a mixture of a major portion of ultraviolet light of wave length in the 2537A area with almost to about as much infrared light, and a very small amount of visible light, derived from a filament-controlled 4-watt spheroidal-form mercury vapor lamp for a predetermined period of time.

A preferred apparatus for the use of such lamps includes a plurality of lamps, including a central lamp, surrounded by a bank of similar lamps forming a square configuration. The lamps are disposed in a cylindrical casing in front of a reflective mirror disposed in the casing. The casing is provided with a detachable cover member comprising an annular outer ring forming a central opening therein with an inner annular ring detachably connected to the perimeter of the central opening which inner ring is provided with a small central opening disposed in front of the central lamp in the casing so that the lamp can be used individually or collectively, to cover any desired area from that covered by a single lamp to that covered by the entire bank of lamps, with radiant energy of equal intensity over the area to be covered.

11 Claims, 5 Drawing Figures

APPARATUS AND METHOD FOR TREATMENT OF SKIN DISORDERS

The present invention is a continuation-in-part of my pending U.S. Pat. application, Ser. No. 244,645, filed Apr. 17, 1972.

BACKGROUND OF THE INVENTION

1. Field of the Invention

This invention is concerned with the treatment of skin disorders with ultraviolet radiation, and with devices for use in said treatment.

2. Statement of the Prior Art

For countless generations, it has been recognized that ultraviolet light is useful in the treatment of certain skin disorders, but that its use was accompanied by the possibility of burning from overexposure. Special utility of the mercury resonance wave band peaking at 2537A was disclosed by Kovacs - Experiences with a New Type of Mercury Glow Lamp - Arch. Physical Therapy 19:661 (November 1938). He used a lamp developed by Rentschler for Westinghouse X-Ray Co., known as a thin-window mercury arc lamp, which produced about 55 percent of ultraviolet light, predominantly in the mercury resonance wave length of 2537A, about 10 percent of visible light, and 35 percent of infrared light which acts synergistically with the ultraviolet light. A considerable amount of promotional effort was expended on this lamp, but the lamp never gained acceptance. It was complicated and expensive, and had the additional drawback that the radiation came from a small thin window which passed radiation surrounded by a substantial expanse of lamp from which no ultraviolet radiation came, so that only a very small area of skin, little more than an inch in diameter, could be treated at one time.

Since then, mercury vapor lamps have come into extensive use as germicidal lamps; the mercury resonance radiation of 2,537A is very near the peak of germicidal effectiveness of about 2,600A. Such lamps are sold by all of the large lamp manufacturers, mostly in the ordinary elongated fluorescent-bulb style, but also in the conventional spheroidal form with a screwin base, such as is used for standard filament-lighting lamps, in which the mercury vapor is controlled by a filament. Despite the work of Kovacs, described above, and the promotional efforts of the manufacturer of the thin-window lamp, all manufacturers of mercury vapor lamps warn against the dangers of burning and eye damage from these lamps.

STATEMENT OF THE INVENTION

I have discovered that the radiation from 4-watt spheroidal-form filament-controlled mercury vapor lamps, which are widely sold as germicidal lamps, produces, in addition to ultraviolet light at the mercury resonance frequency of 2537A, sufficient infrared light to temper and synergize the effect of the ultraviolet, so that radiation from the lamps can be used to treat skin disorders as effectively and as safely as that produced from the old-thin window lamps used by Kovacs. Moreover, since the radiation from these lamps — unlike that from the thinwindow lamps — covers an area somewhat greater than the lamp size, the lamps can be mounted near one another, producing a group of lamps which can be operated together, to cover any desired area to be treated at one time.

According to this invention, these lamps are mounted in front of a reflector, and in back of a shutter, in the form of a central lamp surrounded by one or more rings of lamps, with the shutter so designed that radiation from the lamps can be directed from a single lamp, or one or more desired combinations thereof, to cover the area of skin desired to be treated.

THE DRAWINGS

DETAILED DESCRIPTION OF THE INVENTION

Figure 1:
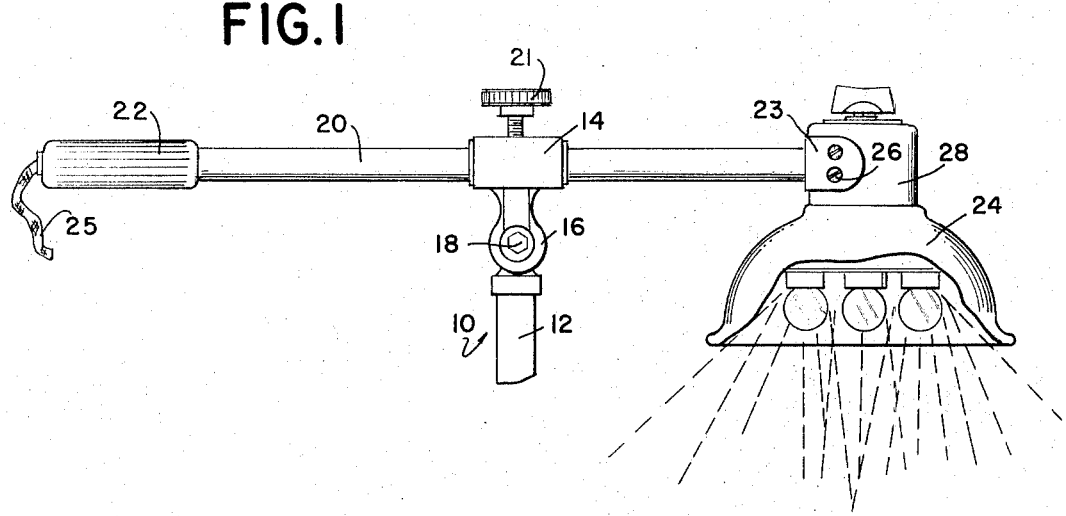
FIG. 1 is a side elevational view of the lamp apparatus of the present invention shown in assembled fashion.

Having been acquainted with the work of Kovacs in the late thirties and with Rentschler's thin-window mercury vapor lamp, I became interested in the possible utility of mercury vapor lamps for dermatological work. The warnings of the manufacturers of these lamps proved accurate insofar as the standard fluorescent-type lamps were concerned — they were, as claimed, germicidal, and, as stated by the manufacturers, produced undesirable action on the skin. However, when I tested the spheroidal filament-controlled 4-watt mercury vapor lamps, which were also sold as germicidal lamps by all the large lamp manufacturers, I discovered that their action approximated that described by Kovacs for the thin-window lamp. Investigation revealed that these lamps produce, in addition to about 45 to 50 percent of ultraviolet light at 2537A, a small amount of other ultraviolet light and a small amount of visible light, and almost to about as much infrared light as ultraviolet. Apparently this infrared light modulates the action of the ultraviolet light sufficiently so that it can be used with a wide margin of safety, and synergizes the effect of the ultraviolet to produce more effective action on skin disorders, producing a hyperemic and analgesic effect.

My own experiments have been confirmed by clinical investigation. One such clinical test is detailed:

Fixty-six patients with infections of the skin were treated. The treated lesions included tinea pedis, tinea capitis, sporotrichosis, and tinnea corporis. Several cases involved dermatophytosis superimposed upon ammoniacal diaper rash in infants.

The patients ranged in age from 10 months to 69 years, with a median age of 19.4 years.

The lamp used in this study contained four 4-watt low-pressure filament-controlled mercury vapor lamps of spheroidal form, about 3.5 centimeters in diameter. An Alzac reflector was used to concentrate the therapeutic rays. When indicated, surrounding tissues were screened with an adjustable diaphragm adapted to the lamp. The operator's and patients' eyes were protected with smoked lenses.

Lamp phototherapy treatments were of 2- to 5-minute duration. The initial prescribed treatment duration was 2 minutes to determine the individual skin sensitivity of the patient, increased by 1 minute each treatment to a maximum treatment time of 5 minutes if tolerated by the patient. The lamp was positioned allowing a distance of 4 inches between the light source and the skin lesion.

Patients in the study received an average of 3.2 lamp treatments over a period of 5 to 7 days. Lamp phototherapy was supplemented by the application of appropriate topical medication, such as tolnaftate or iodochlorhydroxyquin cream. Seven cases with deep fungal infections received oral griseofulvin therapy.

Table I shows the results of therapy in tinea corporis, including dermatophytosis of the extremities (excluding feet), trunk, hands, umbilicus and vulva:

Table I — Results of Phototherapy in Tinea Corporis

| Good Results: | 30 cases | |
| --- | --- | --- |
| (Prompt clearing within 7 to 10 days; no side effects) | Average number of treatments | 2.3 |
| Fair Results: | 2 cases | |
| (Slow clearing, requiring more than 10 days; minimal side effects) | Average number of treatments | 3.6 |
| Poor Results: | 1 case | |
| (Failure to respond and/or severe side effects) | Average number of treatments | 12 |
| | 33 total cases | |

Table II shows the results of therapy in tinea pedis:

Table II — Results of Phototherapy in Tinea Pedis

| Good Results: | 11 cases | |
| --- | --- | --- |
| | Average number of treatments | 3.5 |
| Fair Results: | 1 case | |
| | Average number of treatments | 1 |
| Poor Results: | 0 cases | |
| | Average number of treatments | 0 |
| | 12 total cases | |

Table III describes the results of phototherapy of other infected dermatoses, including sporotrichosis, infected diaper rash, infected atopic eczema, tinea capitis, infected vulvitis, and perianal dermatitis: Table III — Results of Phototherapy in Various Infected Dermatoses

| Good Results: | 9 cases | |
| --- | --- | --- |
| | Average number of treatments | 3.3 |
| Fair Results: | 1 case | |
| | Average number of treatments Includes chronic infected perianal dermatitis | 12 |
| Poor Results: | 1 case | |
| | Average number of treatments Includes second-degree burn following therapy of tinea capitis | 1 |
| | 11 total cases | |

Results

Fifty of the 56 treated patients showed a good response to lamp phototherapy supplemented by topical medication, with clearing of the skin lesion with 7 to 10 days without side effects. In some cases, a single treatment was sufficient to cause marked improvement in the local infection. Most patients experienced significant clearing of the infected dermatitis within 1 week.

Four patients showed only a fair response to treatment; with therapeutic response requiring more than 10 days and/or associated with side effects. One patient suffered from dermatophytosis superimposed upon atopic eczema of the hands. After four lamp treatments, the dermatophytosis showed moderate improvement, but there was no change in the eczema. Two patients with chronic infected dermatitis showed slow improvement without troublesome side effects. Another patient with dermatophytosis of the hands and feet failed to complete the prescribed course of therapy.

Two patients showed poor results, failing to respond to therapy or suffering severe side effects. One of these patients, age 45, suffering from a long-standing infected dermatophytosis of the scalp, discontinued treatment because of local side effects. Also, a 38-year-old patient suffering from extensive excoriated lesions of the hands, wrists and arms, showed no improvement after 12 treatments and was eventually diagnosed as suffering from neurotic excoriations.

Further clinical testing indicates that irradiation with these lamps is useful even with such stubborn ailments as decubitus ulcers in older people, which are highly resistant to conventional treatment. In two recent clinical studies, a number of such cases responded to daily 1-minute treatments with the lamp at 6 inch distance, using from 8 to 10 treatments.

In using the lamps, the inverse-square law of radiant energy applies — halving the distance quadruples the indicent energy. For best results, the lamps are used at from 6 to 12 inches from the skin being treated, with exposure times of from 1 to 5 minutes.

The drawings indicate a typical lamp and how the lamps can be put to use.

Referring to the drawings, the reference numeral 10 generally designates the lamp apparatus or device of the present invention and includes a rod 12 which may have wheels or casters for moving the apparatus around on its bottom, not shown. The upper end of the rod 12 is provided with a sleeve 14 swivelly connected thereto by a bifurcated member 16 having a threaded screw member 18 and nut. A lamp rod 20 is threaded through the sleeve 14 and a setscrew 21 is provided in the sleeve for fixing the rod 20 thereto at any desired position. The lower end of the rod is provided with a handgrip 22 and electricity is supplied through an electric cord 24 extending through the rod 20.

Figure 2:
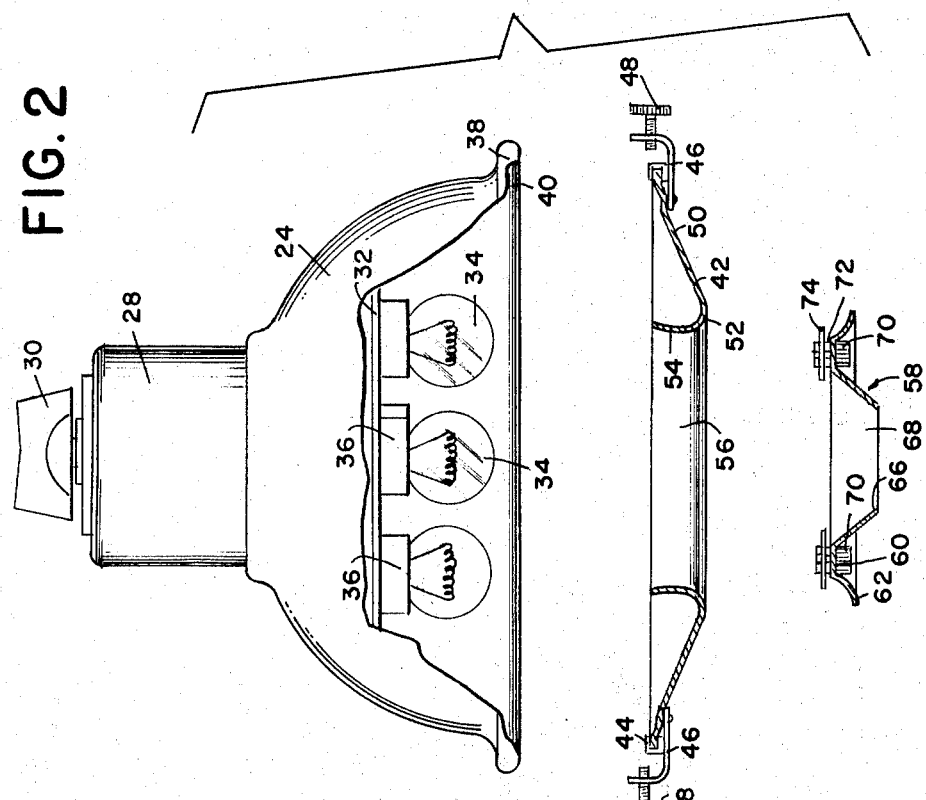
FIG. 2 is an enlarged exploded view with portions broken away, showing in detail the lamp apparatus embodied in the present invention.

The other end of the rod 20 is provided with a U-shaped bracket 23 in which is cradled a lamp head or casing 24 by screw members 26. Referring to FIG. 2, the lamp head 24 is substantially conical in configuration and has a reduced diameter portion 28 where it is secured to the bracket 23. The head 28 may contain a timing switch, not forming part of the invention, which may be of any conventional type and a conventional time setting dial 30 is provided for selecting a predetermined time for cutting off the electricity to the lamp bulbs in the head.

Figure 3:
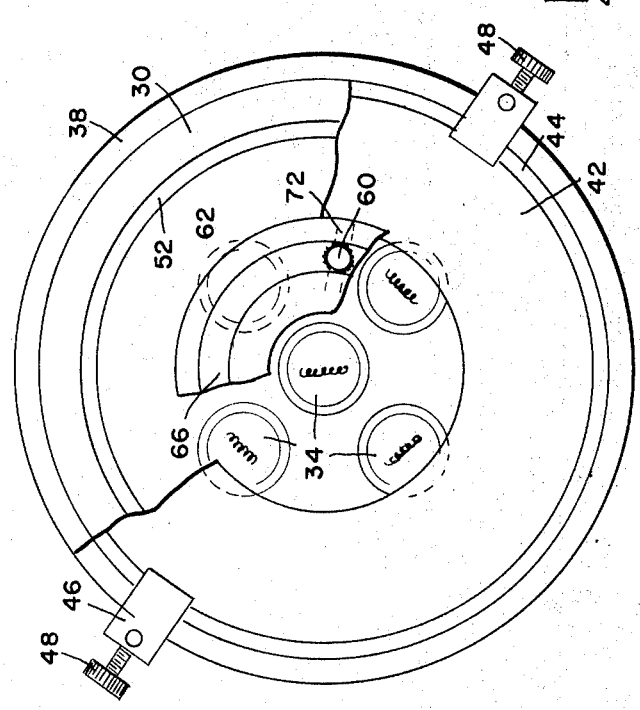
FIG. 3 is a front view of the lamp shown in FIG. 2, with the parts assembled together and with portions broken away to illustrate the details of the invention.

The head 24 is provided with a reflective mirror 32 in the rear portion thereof which will reflect the light from the lamp bulbs 34 without selectively absorbing it. A flat, highly polished aluminum sheet, known as an Alzac mirror is preferred, although silvered quartz and other polished metal surfaces may also be used if desired. The lamp bulbs 34 are disposed in threaded sockets 36 extending out of the mirror 32 and are connected to the source of electricity through the wire or cord 25 which extends completely through the rod 20 and into the lamp head 24. The lamps 34 are filament lamps and may be made of quartz or a special glass which is transparent to ultraviolet. The lamp bulbs contain mercury vapor, which is energized and controlled by current passing from the cord 24 through the filaments. The lamps utilize about 10 to 12 volts and about 0.35 to 0.4 amperes, and have a rating of 3.5 to 4.0 watts. These lamps are referred to generally as 4-watt spheroidal-form filament-controlled mercury vapor lamps. Typically, the bulbs are about 3.5 centimeters in diameter and about 5 to 6 centimeters long. As best seen in FIG. 3, the lamps are disposed in the lamp head 24 with one lamp centrally disposed so that it is in alignment with the axis of the lamp head and with the other four lamps disposed in a square around the central lamp bulb. The lamps are further disposed close enough to each other so that the light coming from them forms a continuum. Since the lamps operate at about 10 to 12 volts, they are preferably connected in series, along with a proper ballast, so that the device can be used on a standard 110 to 120 volt line. This permits the use of a single ballast and a single switch, and relay ability of the operator to change the area of irradiation.

The lamp head 24 is provided with a bead 38 extending around its open end and has an outturned rim 40 adjacent thereto to form a seat for an annular cover member 42, as best seen in FIG. 2. The cover member 42 has a sealing gasket 44 of elastomeric material around its edge, adapted to seat on the rim 40 when the cover 42 is attached to the lamp head, as shown in FIG. 3. Two L-shaped members are attached to opposite sides of the cover member 42 by a rivet or similar means and are provided with setscrews 48 adapted to be threaded inwardly under the bead 38, to detachably connect the cover member over the open end of the lamp head. The cover member 42 is flared outwardly or tapered, as indicated at 50, from a point adjacent its L-shaped member 46 and thereafter is turned back upon itself, as indicated at 52 and then bent toward its outer rim, as indicated at 54, so as to provide a central opening 56 therein. The central opening 56, as best seen in FIG. 3, is sufficiently large enough so that the entire bank of bulbs can emit rays of light from the lamp head, as indicated by dotted lines in FIG. 4.

Figure 5:
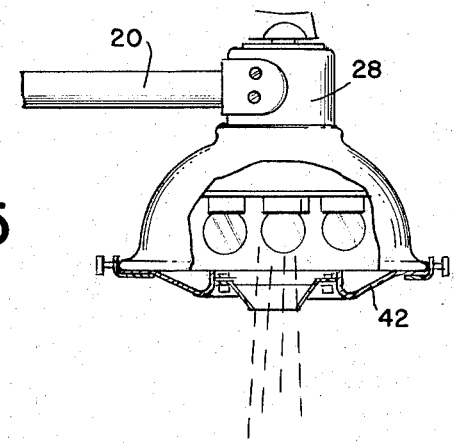
FIG. 5 is a view similar to FIG. 4, but illustrating the apparatus when the inner ring cover member is attached to the outer cover member so as to utilize only the central lamp in the apparatus to cover a small area.

An inner cover member 58 is provided for seating in the central opening 56 of the outer cover member 42. The inner cover member has a flat annular rim 60 adjacent its outer portion and terminates in an outwardly flared outer rim 62. The inner member terminates adjacent its center with a truncated cone configuration 66 providing a central opening 68 adjacent its outer edge. Two rotatable knobs 70 are threaded through the rim 60 and have nuts 72 threaded thereon between which is sandwiched a rectangular resilient sheet metal member 74. The inner cover member 58 is adapted to seat within the central opening 56 of the outer cover member with the flared outer rim 62 seated against the rear of the turned back portion 52 of the outer cover member. The rotation of the knobs 70 causes the sheet metal members 74 to rotate therewith so that the member 74 will catch behind the bent portion 54 of the outer cover member 42 when it is desired to affix the inner cover member to the outer cover member as best seen in FIG. 3. The central opening 68 of the inner cover member is of such a dimension that only the central lamp bulb 34 emits its light rays through the opening 68 when both cover members are detachably connected to the lamp casing or head 24, as best illustrated in FIG. 5.

Thus, when it is desired to treat the skin of a person over a very limited area, the outer cover member 42 is positioned on the lamp head 24 so that its gaskets 44 seat against the seat 40 and the setscrews 48 are then turned in a direction toward the center of the lamp head, so that the outer cover member is fixed to the head. At this time the inner cover member 58 is also seated on the turned back portion 52 of the outer cover member 42 with the sheet metal lock means 74 turned so that they are bearing against the inner end of the bent portions 54 of the outer cover member. Thus, only a very limited or small area of skin is treated at this time when the lamp is plugged into an outlet socket or a source of energy.

Figure 4:
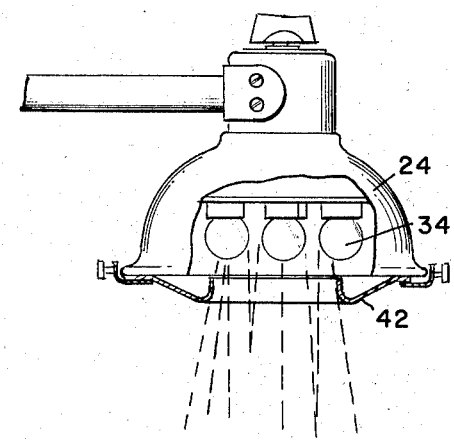
FIG. 4 illustrates the lamp apparatus of the present invention when the inner ring cover member has been removed to utilize the entire bank of lamps embodied in the apparatus.

When it is desired to treat a larger area, the inner cover member is removed from the outer cover member by merely turning the knobs 70 so that the lock portions 74 become unattached from the bent portion 54 and the inner cover member is then removed to provide a larger central opening 56 to cover a larger area of skin to be treated, as best seen in FIG. 4.

When it is desired to treat still a larger area of skin with the ultraviolet and infrared energy, the outer cover is removed by unthreading the setscrews 48 until the setscrews clear the beads 38, at which time the outer cover member is then snapped out of its seated position against the seat 40 and the rays from the lamp bulbs are permitted to cover a much larger area, as illustrated by the dotted lines in FIG. 1.

Thus, the present invention provides a very compact, efficient and easily manufactured apparatus for treatment of skin disease and the like over varying areas of skin in a most efficient manner.

Inasmuch as changes may be made in the method of the present invention, and in the location of the particular parts without departing from the scope of invention, it is not meant to limit the invention except by the scope of the following claims.

What is claimed is:

1. The method of treating skin disorders which comprises irradiating the skin to be treated with the radiation from a 4-watt spheroidal-form filament-controlled mercury vapor lamp which emits about 45 to 50 percent of ultraviolet energy at the mercury resonance wave length of 2537A almost to about as much infrared energy, and small amounts of other ultraviolet and visible energy, said treatment being for a period in the range of 2 to 5 minutes.

2. An apparatus for treating skin disorders comprising a lamp head with a bank of 4-watt spheroidal-form filament-controlled mercury vapor lamps which emits about 45 to 50 percent of ultraviolet energy at the mercury resonance wave length of 2537A almost to about as much infrared energy, and small amounts of other ultraviolet and visible energy, an ultraviolet reflecting mirror in back of said lamps, said lamp head having a detachably connected outer cover member and a detachably connected inner cover member to selectively limit area of the rays emitted by said lamps.

3. The apparatus of claim 2, wherein said inner and outer cover members are detachably connected to each other.

4. The apparatus of claim 3, wherein each of said cover members are annular members.

5. The apparatus of claim 4, wherein said head has an annular seat around its outer periphery and a bead and said outer cover member has an outer flange adapted to seat in said annular seat and locking means are operatively connected to said bead to secure said outer cover member to said head.

6. The device of claim 5, wherein said outer cover has a central opening of substantially smaller diameter than the diameter of said lamp head to limit the area over which rays from said bulbs are emitted.

7. The apparatus of claim 6, wherein said outer cover has its central opening formed by a turned back portion and said inner cover member has an outer flared rim adapted to seat therein and locking means to secure it to said outer cover member.

8. The apparatus of claim 7, wherein lamp bulbs comprise a centrally disposed bulb and a bank of four bulbs spaced therearound.

9. The apparatus of claim 8, wherein the central portion of said inner cover member is a truncated cone forming a central opening, and of sufficient size to prevent emission of light rays from all said bulbs except said central bulb when the inner cover member is attached to the outer cover member.

10. The apparatus of claim 9, wherein said inner cover member locking means comprise a knobbed, threaded member extending therethrough with a resilient wafer member fixed thereon between screw members adapted to turn with said knob.

11. A cover member for attachment to an ultraviolet lamp head having a bank of ultraviolet lamp bulbs to control the area of rays emitted therefrom comprising a first annular ring with locking means for attaching it to a lamp head, a bent back portion in the center of said ring forming a central opening, a seat around the circumference of said ring to seat it against a lamp head, and a second annular ring with a flared outer rim to seat against said bent back portion, said second ring having a central opening therein, and other backing means on the outer portion of said second ring to detachably secure it to said first ring.

* * * * *